(12) United States Patent
Jaswa et al.

(10) Patent No.: US 7,370,224 B1
(45) Date of Patent: May 6, 2008

(54) SYSTEM AND METHOD FOR ENABLING REDUNDANCY IN PCI-EXPRESS ARCHITECTURE

(75) Inventors: Vijay Jaswa, Sunnyvale, CA (US);
Jeffrey Kidd, Los Altos, CA (US);
Robert Haragan, Los Altos, CA (US);
Robert Ferrer, Sunnyvale, CA (US)

(73) Assignee: Alcatel USA Sourcing, Inc DE (US)

( * ) Notice: Subject to any disclaimer, the term of this patent is extended or adjusted under 35 U.S.C. 154(b) by 620 days.

(21) Appl. No.: 11/060,199

(22) Filed: Feb. 17, 2005

(51) Int. Cl.
*G06F 11/00* (2006.01)
(52) U.S. Cl. .......................................... 714/4; 710/316
(58) Field of Classification Search ............... 714/4.43; 710/104, 313, 316
See application file for complete search history.

(56) References Cited

U.S. PATENT DOCUMENTS

| | | | |
|---|---|---|---|
| 6,704,812 B2* | 3/2004 | Bakke et al. ................ | 710/38 |
| 7,058,738 B2* | 6/2006 | Stufflebeam, Jr. ........... | 710/104 |
| 7,093,125 B2* | 8/2006 | Robb et al. ................. | 713/166 |
| 7,099,969 B2* | 8/2006 | McAfee et al. ............. | 710/107 |
| 2006/0112297 A1* | 5/2006 | Davidson ..................... | 714/2 |
| 2006/0136643 A1* | 6/2006 | Lin et al. .................... | 710/302 |

\* cited by examiner

*Primary Examiner*—Marc Duncan (57) ABSTRACT

A method and system is provided to enable redundancy in the communication between a plurality of peripheral devices and redundant hosts through redundant switches. The peripheral devices and the host are connected through a Peripheral Component Interconnect Express (PCI-Express) architecture in a data processing system. In an embodiment of the invention, the system includes a switch, a redundant switch, and switch-level exchanging means. The switch-level exchanging means enables the exchange of data packets between the peripheral devices and the host, through an available switch. The available switch is either the switch or the redundant switch. In another embodiment of the invention, the system also includes a redundant host and host-level exchanging means. The host-level exchanging means enables the exchange of data packets between an available host and the available switch. The available host is either the host or the redundant host.

18 Claims, 10 Drawing Sheets

SYSTEM AND METHOD FOR ENABLING REDUNDANCY IN PCI-EXPRESS ARCHITECTURE

BACKGROUND

The invention relates to the field of redundancy in systems. More specifically, the invention relates to enabling redundancy in Peripheral Component Interconnect Express (PCI-Express) architecture in a data processing system.

PCI architecture typically enables communication between a plurality of peripheral devices and a host in a data processing system. The host detects and initializes the peripheral devices on the data processing system and enables communication between the peripheral devices.

In conventional data processing systems, the PCI architecture used is a shared bus topology, providing lanes for communication between the peripheral devices and the host. A PCI bus (PCI or PCI-X) is used to enable the shared bus topology. The PCI bus is a parallel multiplexed address/data/control bus, with either 32-bit or 64-bit data paths. However, in current data processing systems, the PCI-Express architecture uses a point-to-point topology, in which a switch replaces the bus as the single shared resource by means of which the peripheral devices communicate. Unlike a shared bus topology, where the peripheral devices collectively arbitrate among themselves for the use of the bus, each peripheral device in a point-to-point topology has direct and exclusive access to the switch. PCI-Express is therefore a serialized version of the PCI bus, with standard PCI-Express transactions being encoded into packets that are transmitted serially in a single-bit stream.

In embedded applications such as network appliances, routers or telecom equipment, the reliability of PCI-Express is a concern, since there is no provision for redundancy; for example, if the switch fails, the data processing system also fails.

Further, in current data processing systems, communication between the peripheral devices fails when no host is operational. Even communication between peripheral devices with processors fails, when no host is operational.

In light of the above discussion, there is a need for a system that provides a robust PCI-Express architecture. This system should provide redundancy when the host or the switch is not operational, to improve the reliability of the PCI-Express architecture. Further, the system should enable communication between—peripheral devices as well as external access to the system, when no host is operational.

SUMMARY

An object of the invention is to provide a method and system, enabling redundancy in a Peripheral Component Interconnect Express (PCI-Express) architecture in a data processing system.

Another object of the invention is to provide a method and system, enabling communication between peripheral devices, in the absence of an available host.

Yet another object of the invention is to provide a method and system, for monitoring the redundant switch when the switch is operational.

Another object of the invention is to provide a hot-swapping capability for redundancy-implemented PCI-Express architectures.

The above objectives are fulfilled by using a method and system that enables redundancy in the communication between a plurality of peripheral devices and a host. The peripheral devices and the host are connected through the PCI-Express architecture on the data processing system. The host detects and initializes the peripheral devices. Further, the host also enables communication between the peripheral devices. In an embodiment of the invention, the system includes a switch, a redundant switch, and switch-level exchanging means, to enable the exchange of data packets between the peripheral devices and the host. The switch-level exchanging means enables the exchange of data packets through the redundant switch when the switch is not operational. In another embodiment of the invention, the system also includes a redundant host and host-level exchanging means, to enable the exchange of data packets between an available host and an available switch. The available host is either the host or the redundant host. The available switch is either the switch or the redundant switch. The host-level exchanging means enables the exchange of data packets between the redundant host and the available switch when the host is not operational.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DESCRIPTION OF THE PREFERRED EMBODIMENTS

Various embodiments of the invention provide a system and method, enabling redundancy in Peripheral Component Interconnect Express (PCI-Express) architecture in a data processing system.

Figure 1:
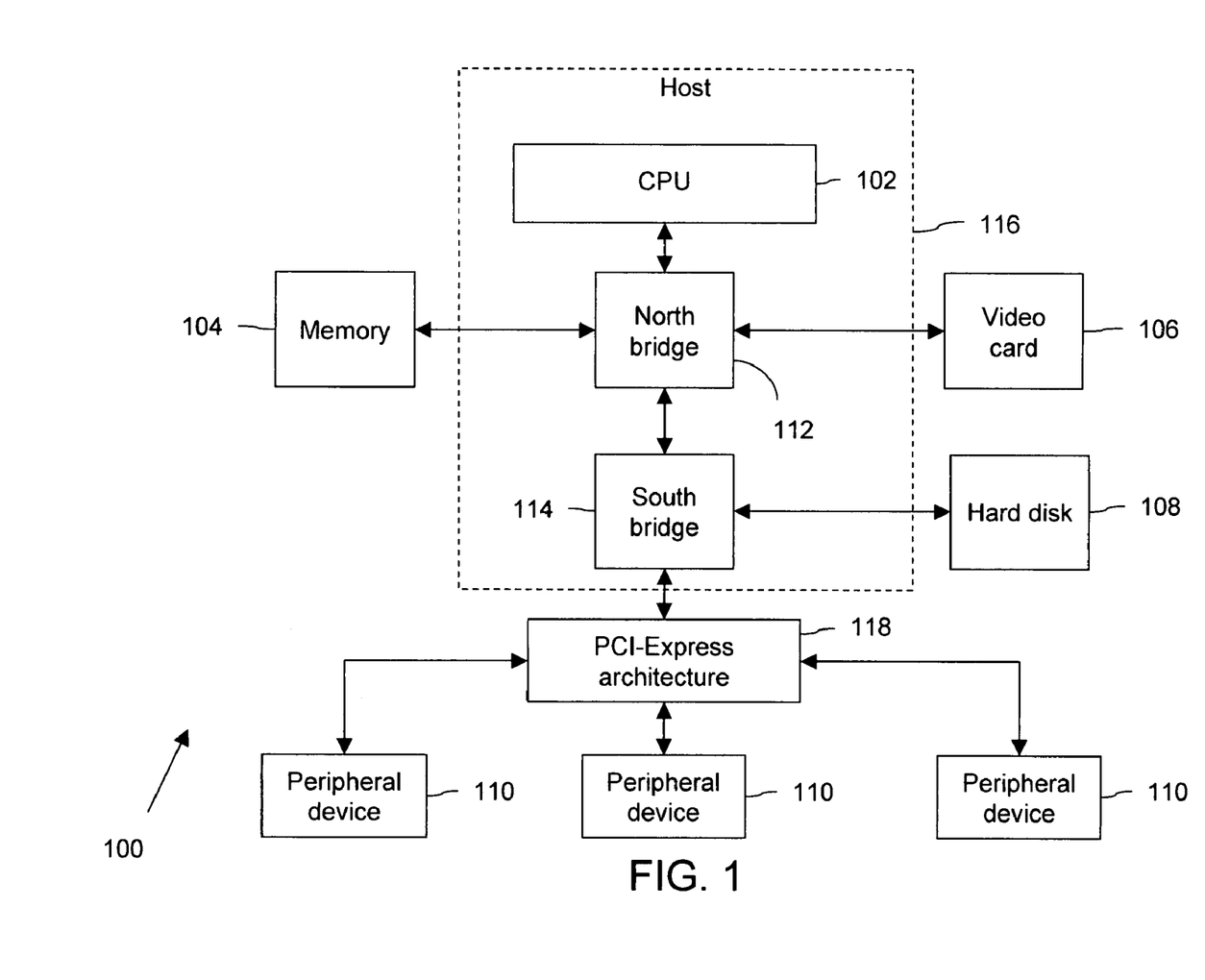
FIG. 1 is a block diagram of a data processing system, illustrating the operational environment of the various embodiments of the invention.

FIG. 1 is a block diagram of a data processing system 100, illustrating the operational environment of the various embodiments of the invention. Data processing system 100 includes a plurality of devices, such as a Central Processing Unit (CPU) 102, a memory 104, a video card 106, a hard disk 108, and a plurality of peripheral devices 110. Data processing system 100 further includes a north bridge 112 and a south bridge 114. CPU 102, north bridge 112 and south bridge 114 are together referred to as a host 116. Peripheral devices 110 and host 116, more specifically, peripheral devices 110 and south bridge 114, are connected through PCI-Express architecture 118 to data processing system 100.

The input/output communication traffic of CPU 102, memory 104 and video card 106 are routed through north bridge 112. Further, the input/output communication traffic of hard disk 108 and other input/output devices, such as Universal Serial Bus (USB) ports and ethernet ports, are routed through south bridge 114. The input/output communication traffic from hard disk 108, USB ports and ethernet ports is routed through south bridge 114 to north bridge 112, and thereafter, to CPU 102 and/or memory 104.

Host 116 initializes and detects peripheral devices 110 and enables communication between peripheral devices 110.

Figure 2:
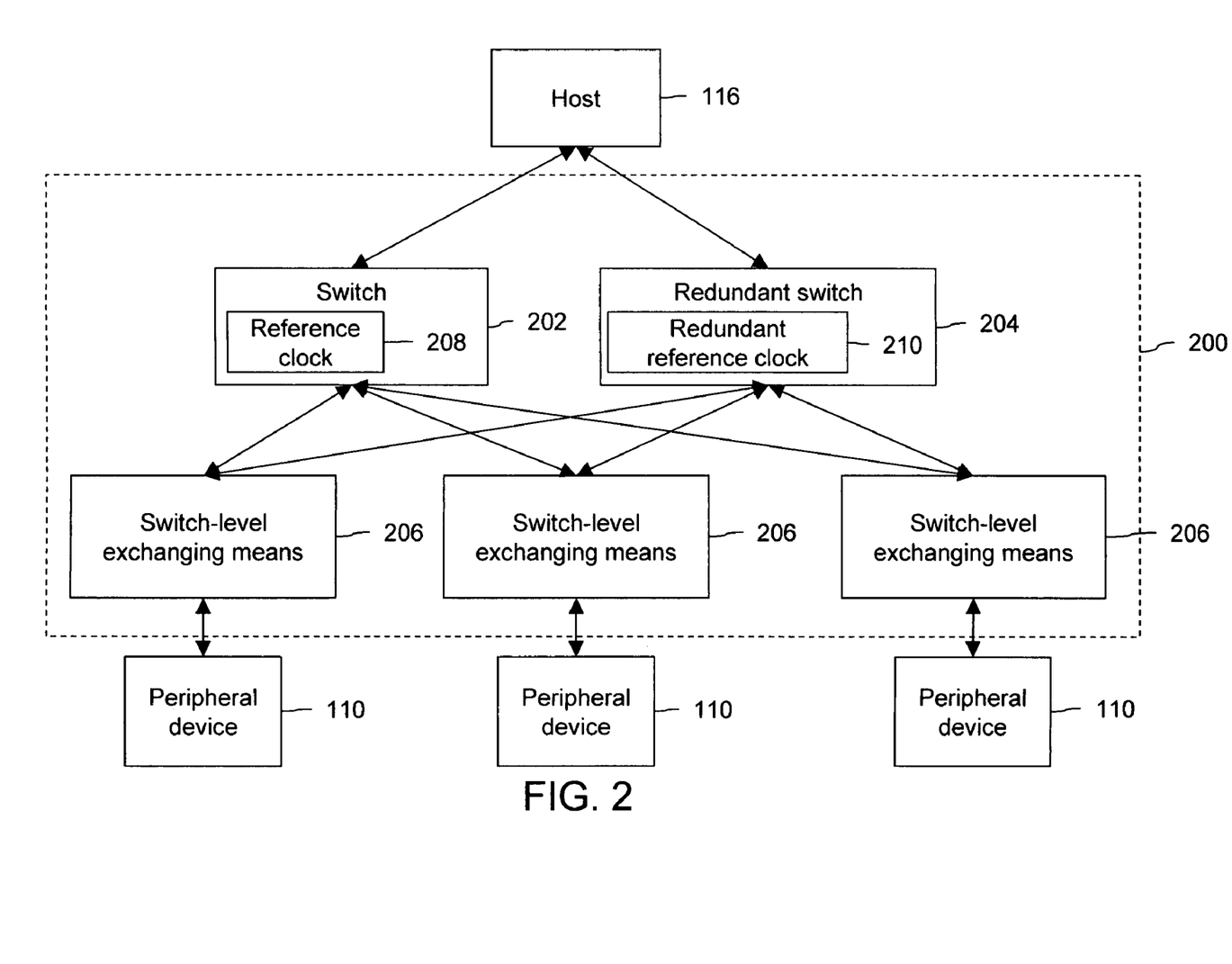
FIG. 2 is a block diagram of a system, enabling redundancy in the communication between a plurality of peripheral devices and a host, in accordance with an embodiment of the invention.

FIG. 2 is a block diagram of a system 200, enabling redundancy in the communication between peripheral devices 110 and host 116, in accordance with an embodiment of the invention. System 200 includes a switch 202, a redundant switch 204, and a plurality of switch-level exchanging means 206.

Switch 202 provides lanes for communication between peripheral devices 110 and host 116. Redundant switch 204 provides redundant lanes for communication between peripheral devices 110 and host 116. In an exemplary embodiment of the invention, switch 202 and redundant switch 204 may be the PLX® PEX line of PCI-Express, i.e., PEX 8516 or PEX 8532. PLX® is a registered trademark of PLX Technology Inc. In another exemplary embodiment of the invention, switch 202 and redundant switch 204 may be an uPD720401 switch manufactured by the NEC Corporation.

In various embodiments of the invention, the number of lanes for communication on each peripheral device 110 may be, for example, in the range of 1 to 32, more specifically 1, 2, 4, 8, 16, or 32.

Switch-level exchanging means 206 enables the exchange of data packets between peripheral devices 110 and host 116 through an available switch. The available switch is either switch 202 or redundant switch 204. In an embodiment of the invention, switch-level exchanging means 206 are connected to switch 202 as well as redundant switch 204. Further, switch-level exchanging means 206 is connected to peripheral device 110.

In various embodiments of the invention, each peripheral device 110 may be connected to at least one switch-level exchanging means 206, depending upon the available switch capacity and the number of lanes for communication on each peripheral device 110. In an exemplary embodiment of the invention, the number of switch-level exchanging means 206 connected to peripheral device 110 is equal to the number of lanes for communication on peripheral device 110.

In various embodiments of the invention, switch-level exchanging means 206 may be a crosspoint switch. In an exemplary embodiment of the invention, the crosspoint switch may be a VSC7175 semiconductor manufactured by the Vitesse Semiconductor Corporation. In another exemplary embodiment of the invention, the crosspoint switch may be a M21260 crosspoint switch manufactured by Mindspeed Technologies Inc.

In various embodiments of the invention, if switch 202 is not operational, switch-level exchanging means 206 enables the exchange of data packets between peripheral devices 110 and host 116. Switch-level exchanging means 206 enables this exchange of data packets through redundant switch 204, enabling redundancy in the communication between peripheral devices 110 and host 116.

In various embodiments of the invention, system 200 may further include a monitoring means for monitoring the availability of redundant switch 204 and its connections while switch 202 is operational. In an embodiment of the invention, the monitoring means may be switch-level exchanging means 206, for example, the availability of redundant switch 204 may be monitored through a crosspoint switch. Switch 202 may direct a data packet to the crosspoint switch, which may then direct it to redundant switch 204. If redundant switch 204 directs the data packet back to switch 202, through the crosspoint switch, then redundant switch 204 is assumed to be available.

In various embodiments of the invention, switch 202 includes a reference clock 208, and redundant switch 204 includes a redundant reference clock 210. System 200 further includes a selecting means for selecting a clock. This has been described in detail in conjunction with FIG. 4.

Figure 3:
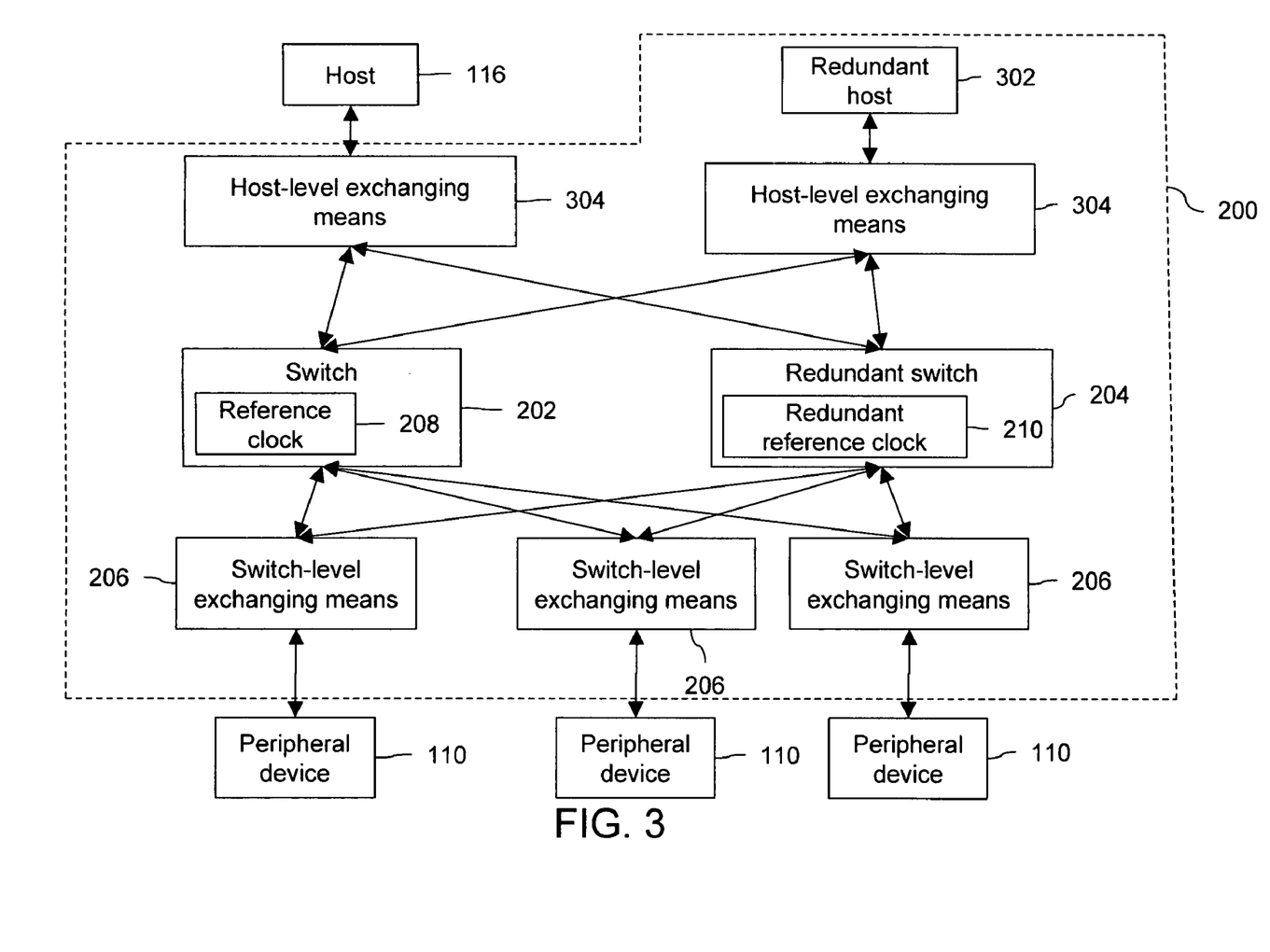
FIG. 3 is a block diagram of a system, enabling redundancy in the communication between a plurality of peripheral devices and a host, in accordance with another embodiment of the invention.

FIG. 3 is a block diagram of system 200, enabling redundancy in the communication between peripheral devices 110 and host 116, in accordance with another embodiment of the invention. In this embodiment, system 200 further includes a redundant host 302 and a plurality of host-level exchanging means 304.

Redundant host 302 provides redundant means for detecting and initializing peripheral devices 110. Further, redundant host 302 provides redundant means for enabling communication between peripheral devices 110.

Host-level exchanging means 304 enables the exchange of data packets between an available host and the available switch. The available host is either host 116 or redundant host 302. In an embodiment of the invention, host-level exchanging means 304 is connected to either host 116 or redundant host 302, or to both of them. In another embodiment of the invention, host-level exchanging means 304 is connected to either host 116 or redundant host 302. Further, each host-level exchanging means 304 is connected to switch 202 as well as to redundant switch 204.

In various embodiments of the invention, host 116 (or redundant host 302) are connected to at least one host-level exchanging means 304, depending on the available switch capacity and the number of lanes for communication on host 116 (or redundant host 302). In an embodiment of the invention, the number of host-level exchanging means 304 connected to host 116 (or redundant host 302) is equal to the number of lanes for communication on host 116 (or redundant host 302).

In various embodiments of the invention, host-level exchanging means 304 may be a crosspoint switch. In an exemplary embodiment of the invention, the crosspoint switch may be a VSC7175 semiconductor manufactured by the Vitesse Semiconductor Corporation. In another exemplary embodiment of the invention, the crosspoint switch may be a M21260 crosspoint switch manufactured by Mindspeed Technologies Inc.

In an embodiment of the invention, if host 116 is not operational, host-level exchanging means 304 enables the exchange of data packets between redundant host 302 and the available switch, enabling redundancy in the communication between the available host and the available switch.

In various embodiments of the invention, system 200 further includes a monitoring means for monitoring the availability of redundant host 302 while host 116 is operational. An exemplary monitoring means is described in a co-pending U.S. patent application Ser. No. 10/950,253, filed on Sep. 27, 2004, entitled 'System and Method for Enabling Management Functions in a Network', the disclosure of which is hereby incorporated by reference.

In various embodiments of the invention, in addition to switch-level exchanging means 206, host-level exchanging means 304 may also monitor the availability of redundant switch 204 while switch 202 is operational, for example, switch 202 may direct a data packet to host-level exchanging means 304. Host-level exchanging means 304 may then direct the data packet to redundant switch 204. If redundant switch 204 directs the data packet back to switch 202, through host-level exchanging means 304, redundant switch 204 is assumed to be available.

In various embodiments of the invention, host 116 includes a clock and redundant host 302 includes a redundant clock. In an embodiment of the invention, the reference clock for the functioning of system 200 may be the clock of either the available host or the available switch. In an exemplary embodiment of the invention, the reference clock for the functioning of system 200 may be the clock of the available switch, i.e., either reference clock 208 or redundant reference clock 210.

Figure 4:
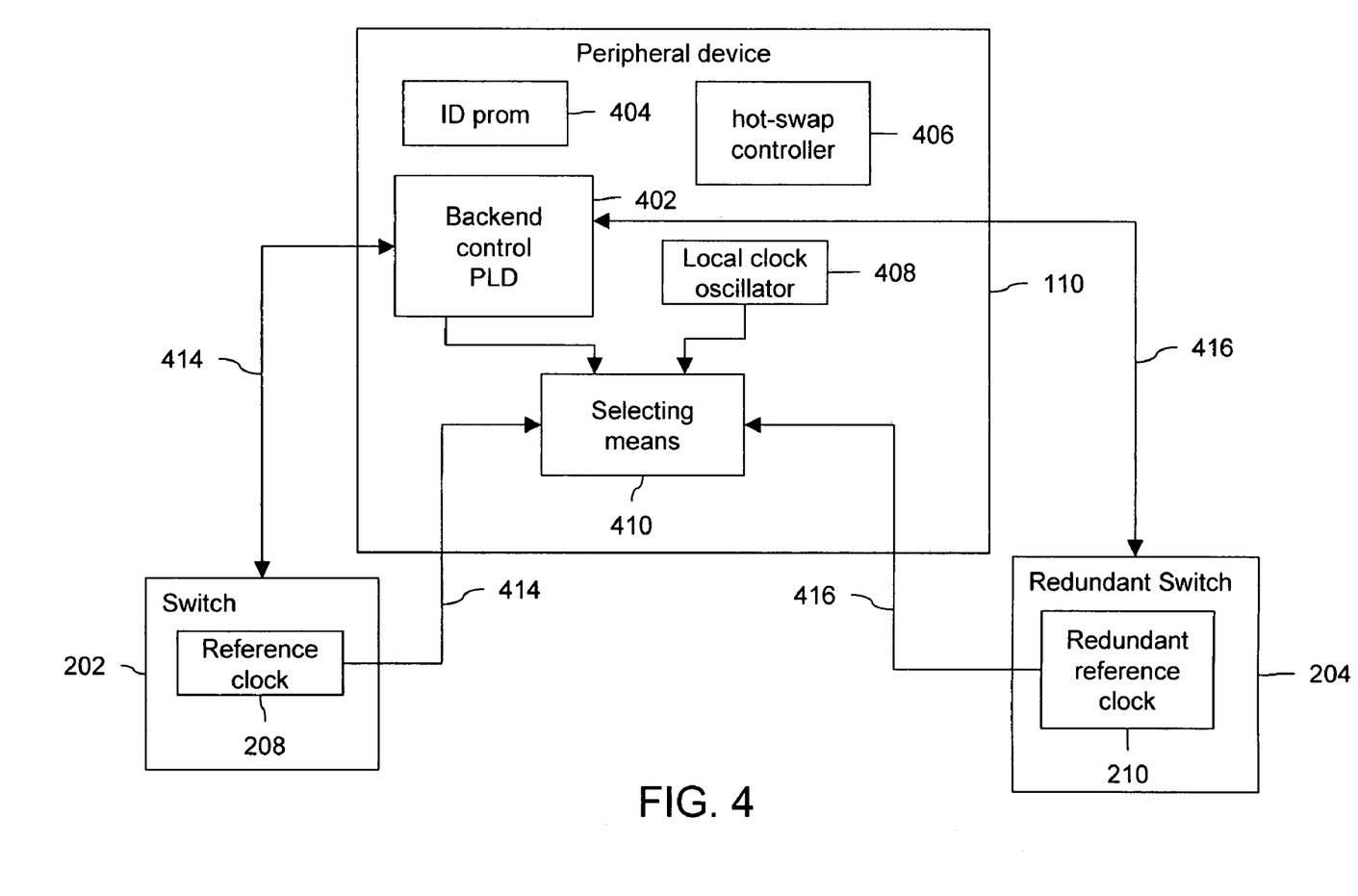
FIG. 4 is a block diagram of a peripheral device, demonstrating its additional interconnections with a switch and a redundant switch, in accordance with an embodiment of the invention.

FIG. 4 is a block diagram of peripheral device 110, showing its additional interconnections with switch 202 and redundant switch 204, in accordance with a further embodiment of the invention. These interconnections are in addition to the interconnections of peripheral device 110 with switch-level exchanging means 206 explained in conjunction with FIG. 2. The interconnections of peripheral device 110 with switch-level exchanging means 206 explained in conjunction with FIG. 2 have not been shown in FIG. 4 for clarity. Each peripheral device 110 includes a backend control Programmable Logic Device (PLD) 402, an ID prom 404, a hot-swap controller 406, a local clock oscillator 408, and a selecting means 410.

The details of backend control PLD 402 have been provided hereinafter. Backend control PLD 402 controls the operation of peripheral device 110. Further, backend control PLD 402 controls the operation of corresponding switch-level exchanging means 206 and host-level exchanging means 304.

In various embodiments of the invention, backend control PLD 402 sends an input to switch-level exchanging means 206. Switch-level exchanging means 206, based on the input from backend control PLD 402, enables the exchange of data packets between peripheral devices 110 and the available host through the available switch. In an embodiment of the invention, switch-level exchanging means 206 may be a crosspoint switch. The input from backend control PLD 402 to the crosspoint switch is based on switch_ok and redundantswitch_ok signals. The switch_ok signal is sent by switch 202 to backend control PLD 402, indicating that switch 202 is available. Similarly, the redundantswitch_ok signal is sent by redundant switch 204 to backend control PLD 402, indicating that redundant switch 204 is available.

In various embodiments of the invention, backend control PLD 402 is directly connected to switch 202 through a link 414, and to redundant switch 204 through a link 416. In an embodiment of the invention, the switch_ok signal is sent by switch 202 to backend control PLD 402 through link 414, and the redundantswitch_ok signal is sent by redundant switch 204 to backend control PLD 402 through link 416. In various embodiments of the invention, link 414 and link 416 are non-PCI-Express links. Link 414 may be a direct-wired connection between switch 202 and backend control PLD 402. Similarly, link 416 may be a direct-wired connection between redundant switch 204 and backend control PLD 402.

In various embodiments of the invention, backend control PLD 402 also sends an input to host-level exchanging means 304. Host-level exchanging means 304, based on the input from backend control PLD 402, enables the exchange of data packets between the available host and the available switch. In an embodiment of the invention, host-level exchanging means 304 may be a crosspoint switch. Backend control PLD 402 sends an input to the crosspoint switch. The input from backend control PLD 402 to the crosspoint switch is based on host_ok and redundanthost_ok signals. The host_ok signal is sent by host 116 to backend control PLD 402, indicating that host 116 is available. Similarly, the redundanthost_ok signal is sent by redundant host 302 to backend control PLD 402, indicating that redundant host 302 is available.

In various embodiments of the invention, backend control PLD 402 is directly connected to host 116 through a link that is similar to link 414, and to redundant host 302 through a link that is similar to link 416. In an embodiment of the invention, the host_ok signal is sent by host 116 to backend control PLD 402 through the link that is similar to link 414, and the redundanthost_ok signal is sent by redundant host 302 to backend control PLD 402 through the link that is similar to link 416.

In an embodiment of the invention, either host 116 or redundant host 302, or both, sequences the hot-swapping of peripheral devices 110 through the link that is similar to link 414 and the link that is similar to link 416. Hot-swapping refers to the connection and disconnection of peripheral devices 110, without interrupting the operation of data processing system 100. In various embodiments of the invention, when peripheral device 110 is connected, backend control PLD 402 sends a 'present' signal to either host 116 or redundant host 302, or to both, through the link that is similar to link 414 and the link that is similar to link 416. In various embodiments of the invention, the sequencing of hot-swapping is performed by using a sideband-signaling mechanism. The sideband-signaling mechanism generally refers to transmitting signals through separate links instead of the lanes for communication that exchange the data packets. For example, the switch_ok signal is sent by switch 202 to backend control PLD 402 through link 414 which is a non-PCI-Express link.

The details of ID prom 404 and hot-swap controller 406 are provided hereinafter. ID prom 404 provides information of peripheral device 110 pertaining to the licensee and the validity of peripheral device 110 to either host 116 or redundant host 302, or to both of them. The licensee generally refers to an entity to whom a license to use peripheral device 110 is granted. ID prom 404 of each peripheral device 110 is connected to a global bus. The global bus is further connected to host 116 and redundant host 302, and may be an Inter-integrated Circuit bus (I2C bus). Hot-swap controller 406 powers peripheral device 110 in response to an input from backend control PLD 402.

The hot-swapping of peripheral devices 110 has been described hereinafter with the help of an example. When peripheral device 110 is connected, backend control PLD 402 sends a 'present' signal to either host 116 or redundant host 302, or to both of them through the link that is similar to link 414 and the link that is similar to link 416, respectively. Host 116 and redundant host 302 receive further information regarding peripheral device 110 (for example, information of peripheral device 110 pertaining to the licensee) from ID prom 404. After ascertaining that peripheral device 110 is valid, and the type is permitted, either host 116 or redundant host 302, or both of them, provides an input to backend control PLD 402, to power peripheral device 110. The input is provided through the link that is similar to link 414 and the link that is similar to link 416, respectively. Backend control PLD 402 sends an input to hot-swap controller 406, to power peripheral device 110. Hot-swap controller 406 then powers peripheral device 110. Thereafter, backend control PLD 402 sends a 'ready' signal to either host 116 or redundant host 302, or to both of them.

The details of selecting means 410 have been provided hereinafter. Selecting means 410 selects a clock by matching the incoming signals (the switch_ok and/or the redundantswitch_ok) to the selected clock. In another embodiment of the invention, selecting means 410 matches incoming signals (the host_ok and/or redundanthost_Ok) to the selected clock.

The incoming signals are synchronous with respect to the reference clock used for the functioning of system 200. Variations in the incoming signals, in terms of frequency drift or phase shift, are due to identical shifts in the reference clock. When a data packet is received by peripheral device 110, the Phase Locked Loop (PLL) of peripheral device 110 recovers the reference clock, to separate it from the data packet. In an embodiment of the invention, the PLL generally refers to an Application-Specific Integrated Circuit (ASIC) in peripheral device 110, which recovers the data from the reference clock.

In various embodiments of the invention, when the PLL of peripheral device 110 recovers the reference clock of system 200 from the incoming signals, selecting means 410 selects the clock, so that the selected clock matches the reference clock.

In various embodiments of the invention, selecting means 410 selects a clock, based on the input from backend control PLD 402. Backend control PLD 402 provides the input to selecting means 410, based on the incoming signals.

In an embodiment of the invention, selecting means 410 selects reference clock 208, redundant reference clock 210, or local clock oscillator 408. In another embodiment of the invention, selecting means 410 selects the clock of host 116, the redundant clock of redundant host 302, or local clock oscillator 408, for example, reference clock 208 is selected when switch 202 is operational, i.e., when switch 202 sends the switch_ok signal to backend control PLD 402. Similarly, redundant reference clock 210 is selected when redundant switch 204 is operational, i.e., when redundant switch 204 sends the redundantswitch_ok signal to backend control PLD 402. Local clock oscillator 408 is selected in the absence of the available switch and/or the available host, for example, local clock oscillator 408 is selected when backend control PLD 402 does not receive the switch_ok and redundantswitch_ok signals from switch 202 and redundant switch 204, respectively. In an exemplary embodiment of the invention, local clock oscillator 408 may be a 100 MHz clock.

In various embodiments of the invention, selecting means 410 may be a clock multiplexer. In an embodiment of the invention, selecting means 410 may be an ICS 85357-01 clock multiplexer manufactured by Integrated Circuit Systems Inc.

Figure 5:
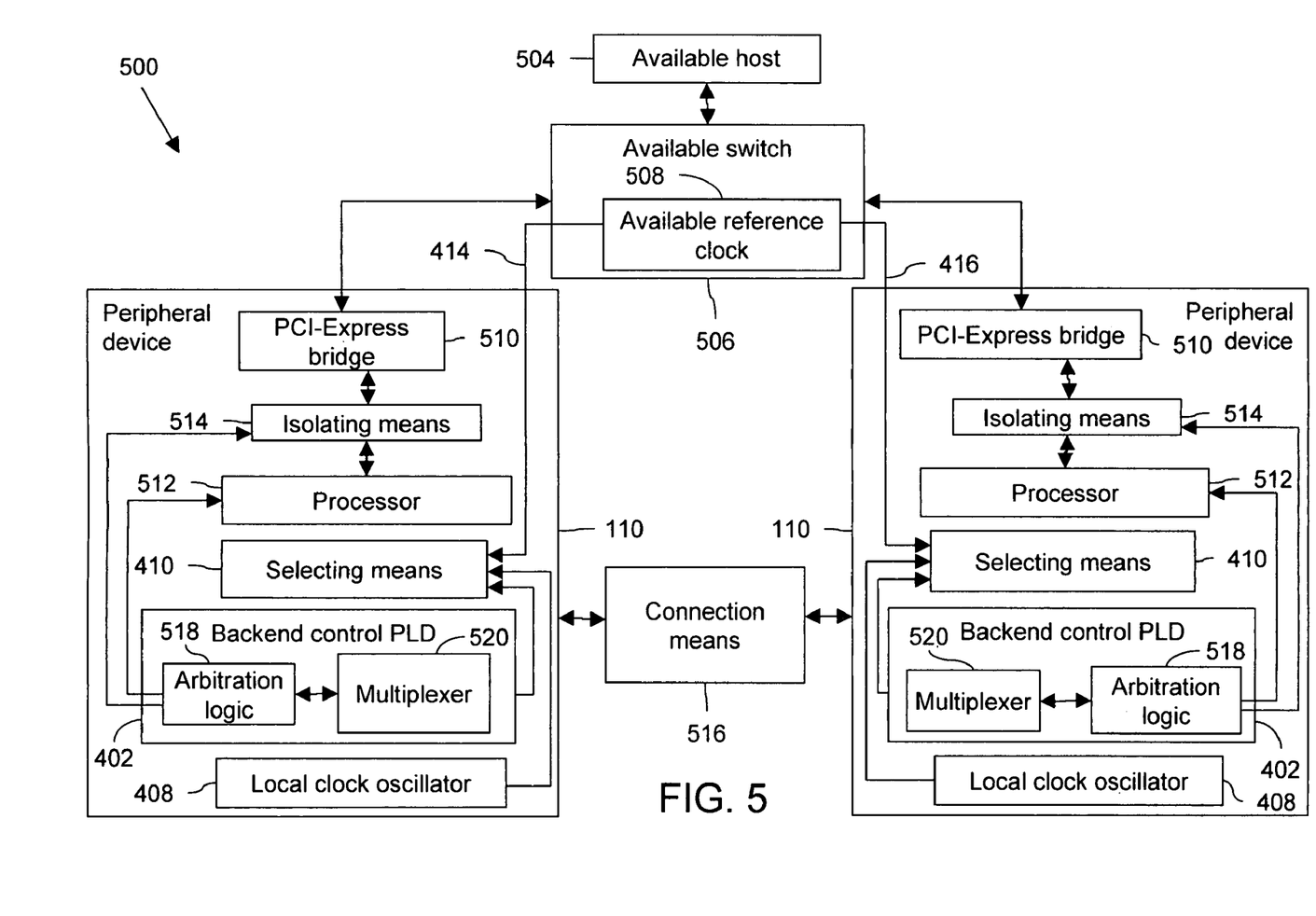
FIG. 5 is a block diagram of a system that enables communication between a plurality of peripheral devices, in the absence of an available host, in accordance with an embodiment of the invention.

FIG. 5 is a block diagram of a system 500, enabling communication between a plurality of peripheral devices 110, in the absence of an available host 504, in accordance with an embodiment of the invention. System 500 further includes an available switch 506, which includes an available reference clock 508. Peripheral device 110 further includes backend control PLD 402, local clock oscillator 408, selecting means 410, a PCI-Express bridge 510, a processor 512, and an isolating means 514. System 500 further includes connection means 516.

Available host 504 is a host that is operational, and may be either host 116 or redundant host 302. Available switch 506 is a switch that is operational and may be either switch 202 or redundant switch 204.

Available reference clock 508 is either reference clock 208 or redundant reference clock 210. In an embodiment of the invention, available reference clock 508 is reference clock 208, if available switch 506 is switch 202. In another embodiment of the invention, available reference clock 508 is redundant reference clock 210, if available switch 506 is redundant switch 204.

In an embodiment of the invention, selecting means 410 selects either local clock oscillator 408 or available reference clock 508. Local clock oscillator 408 is selected in the absence of available host 504 and/or available switch 506. Available reference clock 508 is selected when available switch 506 is operational. In various embodiments of the invention, selecting means 410 selects a clock, based on the input from backend control PLD 402, described in conjunction with FIG. 4.

PCI-Express bridge 510 bridges peripheral device 110 to available switch 506, and is connected to isolating means 514. Isolating means 514 isolates peripheral device 110 from PCI-Express bridge 510, based on the input from backend control PLD 402. More specifically, isolating means 514 isolates processor 512 from PCI-Express bridge 510. In another embodiment of the invention, isolating means 514 isolates the framer of peripheral device 110 from PCI-Express bridge 510.

In various embodiments of the invention, isolating means 514 may be a Field-effect Transistor (FET) switch or a FET multiplexer. In an embodiment of the invention, isolating means 514 may be either a QSVH16211 or a QSVH16233 bus switch, manufactured by Integrated Device Technology Inc.

Connection means 516 provides an alternate bus connection in the absence of available host 504, to enable direct communication between peripheral devices 110 after peripheral devices 110 are isolated from corresponding PCI-Express bridges 510. In various embodiments of the invention, connection means 516 is an ethernet link between each peripheral device 110 and the global bus that communicates with each peripheral device 110.

Backend control PLD 402 further includes an arbitration logic 518 and a multiplexer 520. Arbitration logic 518 arbitrates the flow of data packets within peripheral device 110. Multiplexer 520 generates and receives requests from system 500. When no switch is available, multiplexer 520 diverts the requests to arbitration logic 518. Arbitration logic 518 thereafter arbitrates these requests to processor 512 and/or the framer of peripheral device 110. In various embodiments of the invention, isolating means 514 isolates peripheral device 110 from PCI-Express bridge 510, based on the input from arbitration logic 518. In an embodiment of the invention, arbitration logic 518 and multiplexer 520 are embedded in the hardware logic inside backend control PLD 402.

The method, enabling redundancy in the communication between peripheral devices 110 and host 116, is explained hereinafter, in accordance with an embodiment of the invention. If switch 202 fails, the exchange of data packets is enabled between peripheral devices 110 and host 116 through redundant switch 204. This step is performed by switch-level exchanging means 206, as described in conjunction with FIG. 2. This is described in further detail in conjunction with FIG. 6.

Figure 6:
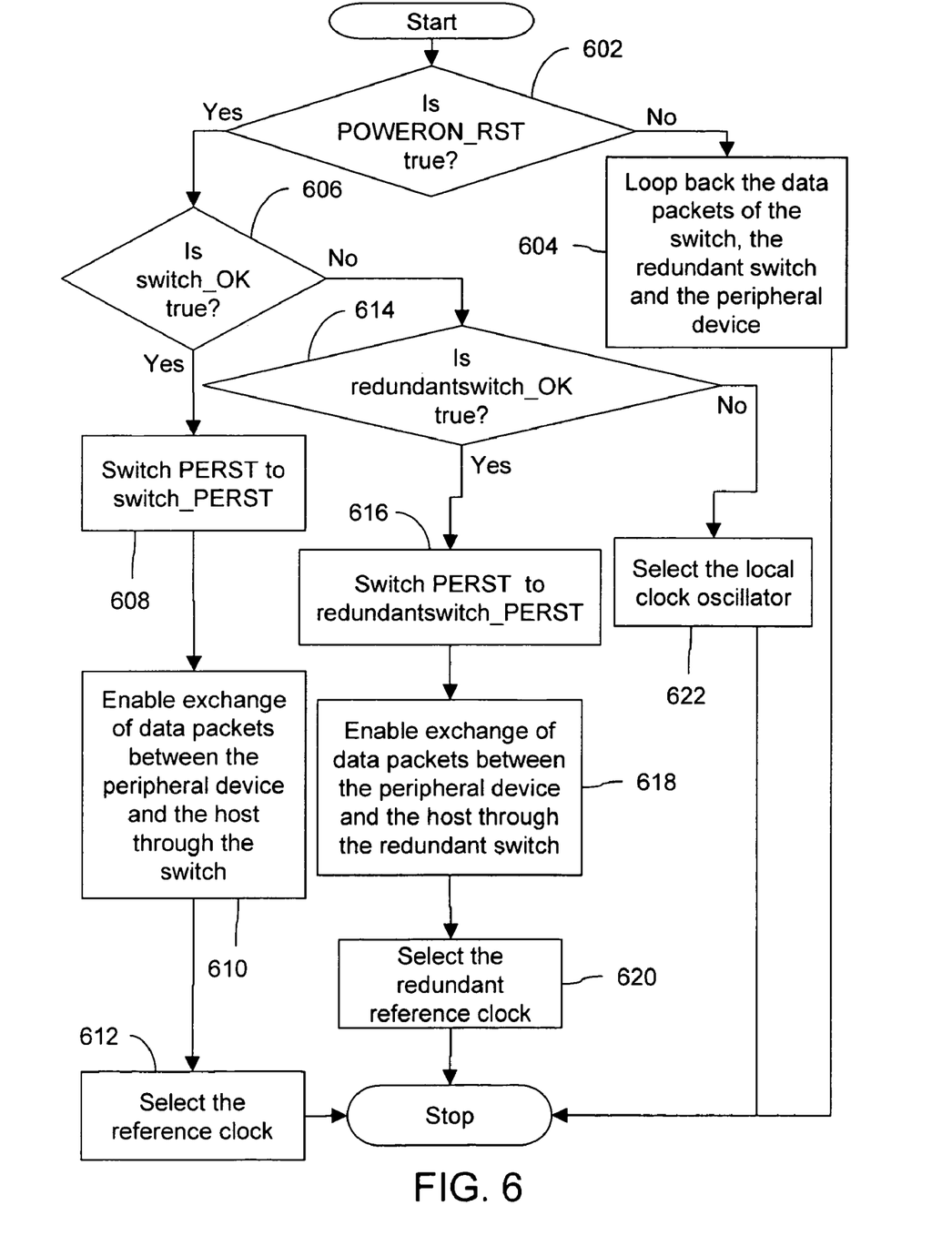
FIG. 6 is a flowchart illustrating a method that enables the exchange of data packets between a plurality of peripheral devices and the host, in the event of a switch-level failure, in accordance with an exemplary embodiment of the invention.

FIG. 6 is a flowchart illustrating a method that enables the exchange of data packets between peripheral devices 110 and host 116, in the event of a switch-level failure, in accordance with an exemplary embodiment of the invention. As described in conjunction with FIG. 4, backend control PLD 402 controls switch-level exchanging means 206. At 602, it is determined whether POWERON_RST is true or false. The POWERON_RST signal is sent by peripheral device 110 to switch 202 and/or redundant switch 204, indicating an initial reset of peripheral device 110. The initial reset of peripheral device 110 refers to the state when peripheral device 110 is being initialized on system 200 and is partly powered, i.e., backend control PLD 402 and ID prom 404 of peripheral device 110 is powered. The POWERON_RST is true when peripheral device 110 sends the signal to switch 202 and/or redundant switch 204. If the POWERON_RST is false, data packets from switch 202, redundant switch 204 and peripheral devices 110 are looped back to switch 202, redundant switch 204 and peripheral devices 110, respectively, as shown at 604. The data packets are looped back through switch-level exchanging means 206. In an embodiment of the invention, the data packets may be looped back by using the following exemplary pseudo code:

"Connect Switch_RECEIVE to Switch_TRANSMIT
Connect RedundantSwitch_RECEIVE to RedundantSwitch_TRANSMIT
Connect PeripheralDevice_RECEIVE to PeripheralDevice_TRANSMIT"

where,

Switch_RECEIVE is an input port of switch 202;

Switch_TRANSMIT is an output port of switch 202;

RedundantSwitch_RECEIVE is an input port of redundant switch 204;

RedundantSwitch_TRANSMIT is an output port of redundant switch 204;

PeripheralDevice_RECEIVE is an input port of peripheral device 110; and

PeripheralDevice_TRANSMIT is an output port of peripheral device 110.

However, if the POWERON_RST is true, it is determined at 606 whether switch 202 is sending the switch_ok signal to backend control PLD 402. If switch 202 is sending the switch_ok signal to backend control PLD 402 (i.e., the switch_ok signal is true), the PERST signal is switched to the switch_PERST signal at 608. The PERST signal generally refers to a signal that indicates a PCI-Express reset of peripheral device 110. The PERST signal may be a message signal sent to peripheral device 110, and is switched to the switch_PERST signal to facilitate redundancy in the communication between peripheral devices 110 and host 116. This is described in detail in conjunction with FIG. 7.

The exchange of data packets between peripheral devices 110 and host 116 is enabled through switch 202 at 610. In an embodiment of the invention, the exchange of data packets may be enabled through switch 202 by means of the following exemplary pseudo code:

"Connect PeripheralDevice_TRANSMIT to Switch_TRANSMIT
Connect PeripheralDevice_RECEIVE to Switch_RECEIVE"

Further, if redundant switch 204 is available, data packets from redundant switch 204 are looped back to redundant switch 204. Reference clock 208 is selected at 612. Selecting means 410 performs the step of selecting reference clock 208.

However, if switch 202 does not send the switch_ok signal to backend control PLD 402, it is determined at 614 whether redundant switch 204 is sending the redundantswitch_ok signal to backend control PLD 402. If redundant switch 204 is sending the redundantswitch_ok signal to backend control PLD 402 (i.e., the redundantswitch_ok signal is true), the PERST signal is switched to the redundantswitch_PERST signal at 616. The PERST signal is switched to the redundantswitch_PERST signal to facilitate the transition from switch 202 to redundant switch 204. This is described in detail in conjunction with FIG. 7. The exchange of data packets between peripheral devices 110 and host 116 is enabled through redundant switch 204 at 618. In an embodiment of the invention, the exchange of data packets may be enabled through redundant switch 204 by means of the following exemplary pseudo code:

"Connect PeripheralDevice_TRANSMIT to RedundantSwitch_TRANSMIT
Connect PeripheralDevice_RECEIVE to RedundantSwitch_RECEIVE"

Redundant reference clock 210 is selected at 620. Selecting means 410 performs the step of selecting redundant reference clock 210.

However, if redundant switch 204 does not send the redundantswitch_ok signal to backend control PLD 402, local clock oscillator 408 is selected at 622. Selecting means 410 performs the step of selecting local clock oscillator 408. This is described in detail in conjunction with FIG. 10.

In various embodiment of the invention, the availability of redundant switch 204 is monitored while switch 202 is operational, for example, the availability of redundant switch 204 may be monitored through a crosspoint switch. Switch 202 may direct a data packet to the crosspoint switch, which may then direct it to redundant switch 204. If redundant switch 204 directs the data packet back to switch 202, through the crosspoint switch, redundant switch 204 is assumed to be available.

Figure 7:
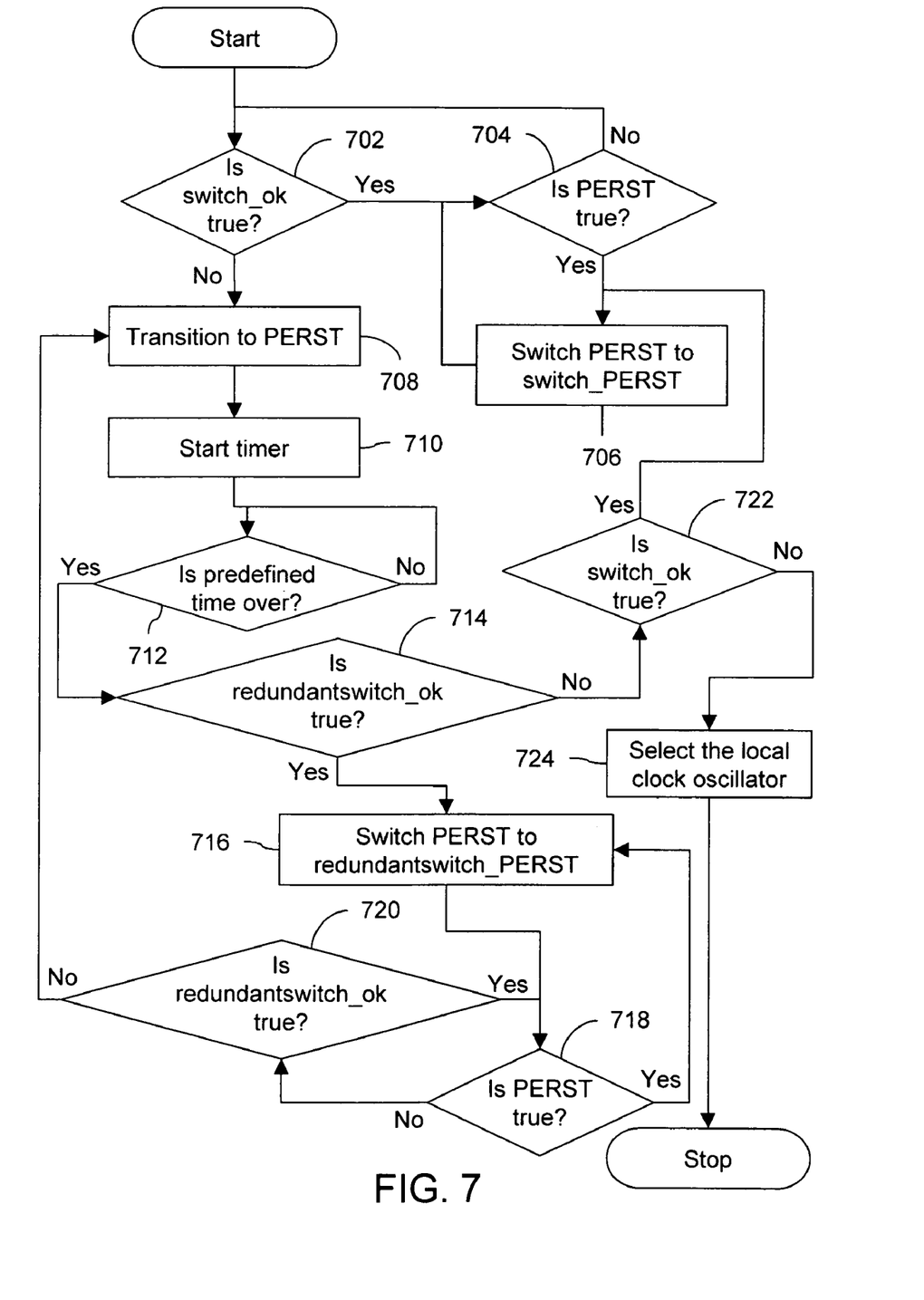
FIG. 7 is a flowchart illustrating a method that facilitates redundancy in the communication between the peripheral devices and the host, in accordance with an exemplary embodiment of the invention.

FIG. 7 is a flowchart illustrating a method that facilitates redundancy in the communication between peripheral devices 110 and host 116, in accordance with an exemplary embodiment of the invention. At 702, it is determined whether switch 202 is sending the switch_ok signal to backend control PLD 402. If switch 202 is sending the switch_ok signal to backend control PLD 402 (i.e., the switch_ok signal is true), it is determined at 704 whether the PERST signal is true or false. The PERST signal is true when it is not switched to either the switch_PERST signal or the redundantswitch_PERST signal. The PERST signal is switched to either the switch_PERST signal or the redundantswitch_PERST signal when either switch 202 or redundant switch 204 is enabling the exchange of data packets between peripheral devices 110 and host 116. If the PERST signal is true, it is switched to the switch_PERST signal at 706. Thereafter, system 200 again determines at 704 whether the PERST signal is true. However, if the PERST signal is not true at 704, system 200 again determines whether switch 202 is sending the switch_ok signal to backend control PLD 402 at 702.

If switch 202 does not send the switch_ok signal to backend control PLD 402 at 702, a transition is made to the PERST signal at 708. The switch_PERST signal is then switched to the PERST signal.

Further, when switch-level exchanging means 206 enables the exchange of data packets between peripheral devices 110 and host 116 through redundant switch 204, the PERST signal is sent to peripheral devices 110 during the transition from switch 202 to redundant switch 204 for a predefined time. The predefined time may be in the range 10 to 100 milliseconds. The PERST signal is sent to peripheral devices 110 to reset them, in order to facilitate a smooth transition from switch 202 to redundant switch 204, or vice versa.

Therefore, a timer is set for the predefined time at 710. It is determined at 712 whether the predefined time is over. In the meanwhile, peripheral devices 110 are reset. If the predefined time is over, it is determined whether redundant switch 204 is sending the redundantswitch_ok signal to backend control PLD 402 at 714.

If redundant switch 204 is sending the redundantswitch_ok signal to backend control PLD 402, the PERST signal is switched to the redundantswitch_PERST signal at 716. Thereafter, it is determined whether the PERST is true or false, as shown at 718. If the PERST signal is false, it is determined whether redundant switch 204 is sending the redundantswitch_ok signal to backend control PLD 402 (i.e., the redundantswitch_ok signal is true), as shown at 720. If it is determined at 720 that redundant switch 204 is sending the redundantswitch_ok signal to backend control PLD 402, system 200 again determines whether the PERST signal is true at 718. If the PERST signal is true, the PERST is switched to the redundantswitch_PERST signal at 716. However, if it is determined at 720 that redundant switch 204 does not send the redundantswitch_ok signal to backend control PLD 402, a transition is made to the PERST signal at 708, and the redundant_PERST signal is switched to the PERST signal.

Further, if it is found at 714 that redundant switch 204 did not send the redundantswitch_ok signal to backend control PLD 402, it is determined whether switch 202 is sending the switch_ok signal to backend control PLD 402, as shown at 722. If switch 202 is sending the switch_ok signal to backend control PLD 402, the PERST signal is switched to the switch_PERST signal, as shown at 706.

However, if it is determined at 722 that switch 202 did not send the switch_ok signal to backend control PLD 402, local clock oscillator 408 is selected at 724. This is explained further in conjunction with FIG. 10.

System 200 further includes means for facilitating redundancy. The means for facilitating redundancy resets peripheral device 110 for the predefined time in order to facilitate a smooth transition from switch 202 to redundant switch 204, or vice versa, as explained in conjunction with FIG. 7. The means for facilitating this redundancy is implemented as a combination of logic in backend control PLD 402 and a locally resident software module in the on-board processor.

The method, enabling redundancy in the communication between peripheral devices 110 and available host 504, is explained hereinafter, in accordance with an embodiment of the invention. If host 116 fails, the exchange of data packets is enabled between redundant host 302 and available switch 506. This step is performed by host-level exchanging means 304, as described in conjunction with FIG. 3. Further, local clock oscillator 408 is selected when no host and/or switch is operational. This step is performed by selecting means 410, as described in conjunction with FIG. 4. This is described in detail in conjunction with FIG. 8.

Figure 8:
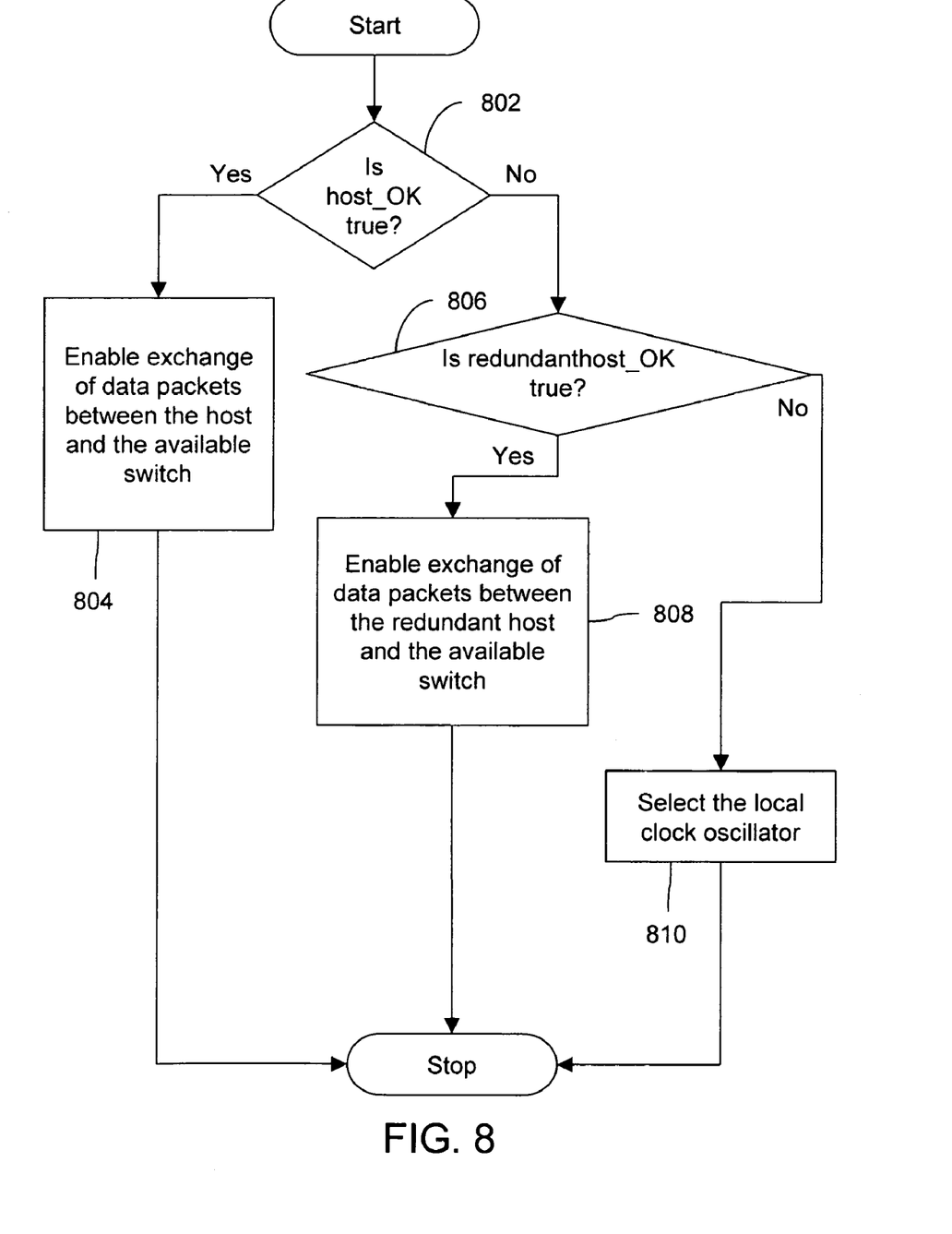
FIG. 8 is a flowchart illustrating a method that enables the exchange of data packets between an available host and an available switch, in the event of a host-level failure, in accordance with an exemplary embodiment of the invention.

FIG. 8 is a flowchart illustrating a method that enables the exchange of data packets between available host 504 and available switch 506, in the event of a host-level failure, in accordance with an exemplary embodiment of the invention. As described in conjunction with FIG. 4, backend control PLD 402 controls host-level exchanging means 304. At 802, it is determined whether host 116 is sending the host_ok signal to backend control PLD 402. If host 116 is sending the host_ok signal to backend control PLD 402, the exchange of data packets between host 116 and available switch 506 is enabled at 804. In an embodiment of the invention, the exchange of data packets may be enabled between host 116 and available switch 506 through the following exemplary pseudo code:

"Connect Host_TRANSMIT to AvailableSwitch_RECEIVE

Connect Host_RECEIVE to AvailableSwitch_TRANSMIT"

where,

Host_RECEIVE is an input port of host 116;

Host_TRANSMIT is an output port of host 116;

AvailableSwitch_RECEIVE is an input port of available switch 506; and

AvailableSwitch_TRANSMIT is an output port of available switch 506.

However, if host 116 does not send the host_ok signal to backend control PLD 402, it is determined whether redundant host 302 is sending the redundanthost_ok signal to backend control PLD 402 at 806. If redundant host 302 is sending the redundanthost_ok signal to backend control PLD 402, the exchange of data packets between redundant host 302 and available switch 506 is enabled at 808. In an embodiment of the invention, the exchange of data packets between redundant host 302 and available switch 506 may be enabled through the following exemplary pseudo code:

"Connect RedundantHost_TRANSMIT to AvailableSwitch_RECEIVE

Connect RedundantHost_RECEIVE to AvailableSwitch_TRANSMIT

Disconnect Host_TRANSMIT to AvailableSwitch_RECEIVE

DisConnect Host_RECEIVE to AvailableSwitch_TRANSMIT"

where,

RedundantHost_RECEIVE is an input port of redundant host 302; and

RedundantHost_TRANSMIT is an output port of redundant host 302.

However, if redundant host 302 does not send the redundanthost_ok signal to backend control PLD 402, local clock oscillator 408 is selected at 810. Selecting means 410 performs the step of selecting local clock oscillator 408.

In various embodiments of the invention, either host 116 or redundant host 302, or both of them, sequences the hot-swapping of peripheral devices 110 through a link that is similar to link 414 and a link that is similar to link 416. In an embodiment of the invention, hot-swapping sequencing is performed by using the sideband-signaling mechanism. This is described in detail in conjunction with FIG. 9.

Figure 9:
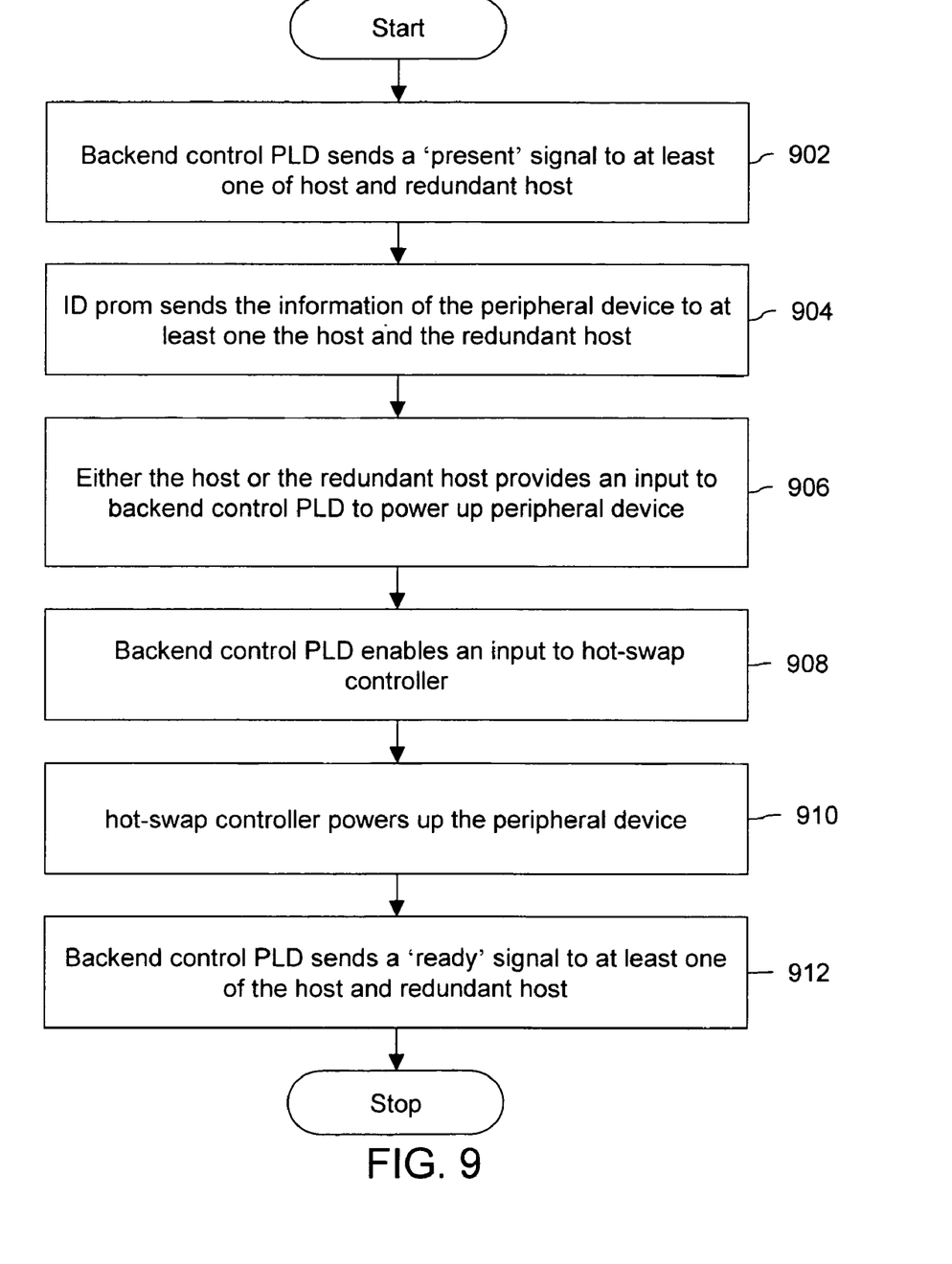
FIG. 9 is a flowchart illustrating a method, hot-swapping sequencing, in accordance with an embodiment of the invention.

FIG. 9 is a flowchart illustrating a method, hot-swapping sequencing, in accordance with an embodiment of the invention. At 902, backend control PLD 402 sends a 'present' signal to either host 116 or redundant host 302, or to both of them through link 414 and link 416, when peripheral device 110 is connected. At 904, ID prom 404 sends information pertaining to peripheral device 110 (for example, the licensee information) to either host 116 or redundant host 302, or to both of them.

After making certain that peripheral device 110 is valid and the type is permitted, either host 116 or redundant host 302 provides the input to backend control PLD 402 through link 414 and link 416, at 906. At 908, backend control PLD 402 enables an input to hot-swap controller 406, to power peripheral device 110. Hot-swap controller 406 powers peripheral device 110 at 910. Backend control PLD 402 then sends a 'ready' signal to either host 116 or redundant host 302, or to both of them, at 912.

In an exemplary embodiment of the invention, when system 500 is undergoing a reset, peripheral device 110 may undergo a cold boot reset. In the case of the cold boot reset, backend control PLD 402 waits for either switch 202 or redundant switch 204 to provide power to peripheral device 110. In this case, hot-swap controller 406 is enabled through the following exemplary pseudo code:

"If POWERON_RST AND State=Cold_Boot;
then {
If ((switch_ok AND switch_power_en) OR (redundantswitch_ok AND
redundantswitch_power en)) then
{HotSwapEn=True;
State=Power_Enabled;}
}"

where, state is a variable that is indicative of the state of peripheral device 110, in which peripheral device 110 is being reset, i.e., peripheral device 110 is being powered after the initialization of peripheral device 110 (i.e., State=Cold_Boot), or peripheral device 110 is being reset after peripheral device 110 is completely powered (i.e., State=Power_Enabled). Switch_power_en is a signal sent by switch 202 to backend control PLD 402 through link 414, after ascertaining that peripheral device 110 is valid and the type is permitted. Redundantswitch_power_en is a signal sent by redundant switch 204 to backend control PLD 402 through link 416, after ensuring that peripheral device 110 is valid and the type is permitted. HotSwapEn is a signal sent by backend control PLD 402 to hot-swap controller 406, to apply power to the rest of peripheral device 110; and Power_Enabled is a value that indicates that complete peripheral device 110 is powered.

In another exemplary embodiment, if peripheral device 110 is being reset after it is completely powered, hot-swap controller 406 is enabled through the following exemplary pseudo code:

"If (State=Power_Enabled) then
If {(switch_ok AND switch_power_en) OR (redundantswitch_ok AND
redundantswitch_power_en) OR (!switch_Ok AND !redundantswitch_Ok)} then
HotSwapEn=True;}"

Peripheral device 110 may be reset after it is completely powered, for example, when there is a software failure in peripheral device 110. Further, if peripheral device 110 is powered, then even if no switch is available, peripheral device 110 remains powered. This is described in detail in conjunction with FIG. 10.

Figure 10:
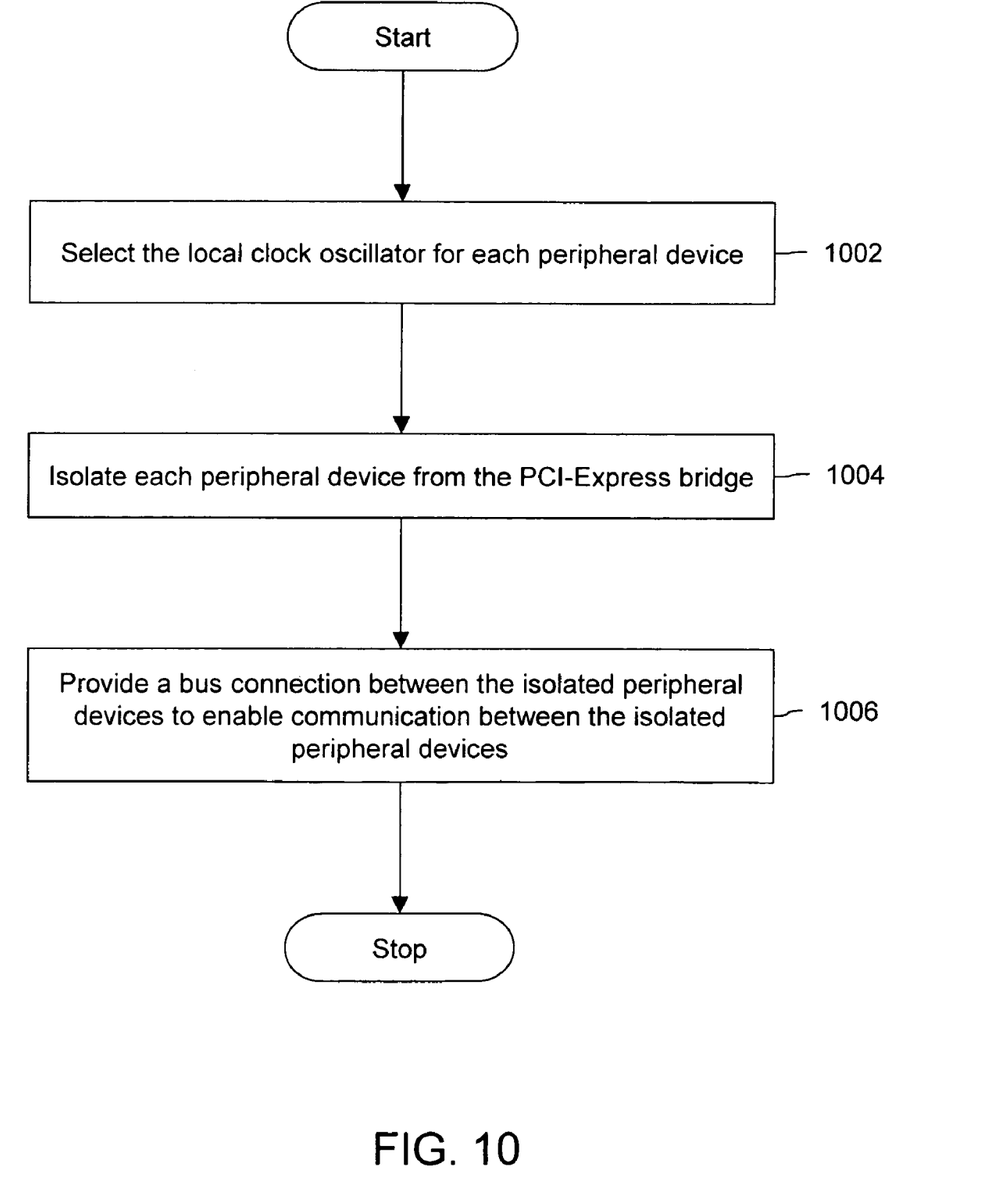
FIG. 10 is a flowchart illustrating a method that enables communication between a plurality of peripheral devices, in the absence of an available host, in accordance with an embodiment of the invention.

FIG. 10 is a flowchart illustrating a method that enables communication between peripheral devices 110, in the absence of available host 504, in accordance with an embodiment of the invention. At 1002, local clock oscillator 408 is selected for each peripheral device 110, in the absence of available host 504 and/or available switch 506. This step is performed by selecting means 410, as described in conjunction with FIG. 5.

At 1004, each peripheral device 110 is isolated from PCI-Express bridge 510. This step is performed by isolating means 514, as described in conjunction with FIG. 5. If available host 504 is absent when PCI-Express bridge 510 ascertains the resetting of each peripheral device 110, backend control PLD 402 intercepts this reset. Backend control PLD 402 then provides an input to isolating means 514, to isolate each peripheral device 110 from PCI-Express bridge 510.

A bus connection between isolated peripheral devices 110 is provided at 1006, to enable communication between them. This step is performed by connection means 516, as described in conjunction with FIG. 5. Processor 512 controls the bus connection provided by connection means 516. Processor 512 then acts as a host for each isolated peripheral device 110.

The various embodiments of the invention provide a method and system, enabling redundancy in PCI-Express architecture in a data processing system. The redundancy makes the system more robust. Further, the various embodiments of the invention provide monitoring means for monitoring a redundant switch when the switch is operational. This ensures that the system is reliable. The various embodiments of the invention also provide a hot-swapping capability to the redundancy-implemented PCI-Express architecture. The various embodiments of the invention also provide the hot-swapping capability that first detects the peripheral device and then initializes it, only when the peripheral device is valid and is permitted.

The various embodiments of the invention also provide a method and system, enabling communication between peripheral devices in the absence of an available host. This ensures communication between peripheral devices with processors, even in the absence of the available host.

The system, as described in the invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the invention.

The computer system comprises a computer, an input device, a display unit and the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system for enabling redundancy in communication between a plurality of peripheral devices and a host, the peripheral devices and the host being connected through Peripheral Component Interconnect Express (PCI-Express) architecture in a data processing system, the host detecting and initializing the peripheral devices, the host enabling communication between the peripheral devices, the system comprising:
   a. a switch, the switch providing lanes for communication between the peripheral devices and the host, the switch comprising a reference clock;
   b. a redundant switch, the redundant switch providing redundant lanes for communication between the peripheral devices and the host, the redundant switch comprising a redundant reference clock; and
   c. switch-level exchanging means, the switch-level exchanging means enabling exchange of data packets between the peripheral devices and the host through an available switch, the available switch being either the switch or the redundant switch, the switch-level exchanging means enabling exchange of data packets through the redundant switch when the switch is not operational.

2. The system in accordance with claim 1 further comprising:
   a. a redundant host, the redundant host providing redundant means for detecting and initializing the peripheral devices, the redundant host providing redundant means for enabling communication between the peripheral devices; and
   b. host-level exchanging means, the host-level exchanging means enabling exchange of data packets between an available host and the available switch, the available host being either the host or the redundant host, the host-level exchanging means enabling exchange of data packets between the redundant host and the available switch when the host is not operational.

3. The system in accordance with claim 2 further comprising means for linking at least one of the host and the redundant host, to backend control Programmable Logic Device (PLD) of each peripheral device, the backend control PLD controlling the operations of the peripheral device, the switch-level exchanging means and the host-level exchanging means.

4. The system in accordance with claim 3, wherein hot-swapping sequencing is performed by using a sideband-signaling mechanism, the hot-swapping being the connection and disconnection of the peripheral device without interrupting the operation of the data processing system.

5. The system in accordance with claim 2 further comprising:
   a. a local clock oscillator on each peripheral device; and
   b. selecting means, the selecting means selecting the local clock oscillator, the reference clock, or the redundant reference clock for each peripheral device, the reference clock being selected when the switch is operational, the redundant reference clock being selected when the redundant switch is operational, and the local clock oscillator being selected when no host and/or switch is operational.

6. The system in accordance with claim 1 further comprising monitoring means for monitoring the availability of the redundant switch while the switch is operational.

7. The system in accordance with claim 1 further comprising means for linking at least one of the switch and the redundant switch, to a backend control Programmable Logic Device (PLD) of each peripheral device, the backend control PLD controlling the operation the peripheral device, the switch-level exchanging means and the host-level exchanging means.

8. The system in accordance with claim 1 further comprising:
   a. a local clock oscillator on each peripheral device; and
   b. selecting means, the selecting means selecting either the local clock oscillator or the reference clock for each peripheral device, the local clock oscillator being selected when no host and/or switch is operational.

9. The system in accordance with claim 1 further comprising means for facilitating redundancy in communication between the peripheral devices and the host, the means for facilitating redundancy resetting the peripheral device for a predefined time.

10. A system for enabling communication between a plurality of peripheral devices in the absence of an available host, each peripheral device and the available host being connected through Peripheral Component Interconnect Express (PCI-Express) architecture in a data processing system, each peripheral device comprising a processor, the available host being the host that is operational, the available host detecting and initializing the peripheral devices, the available host enabling communication between the peripheral devices, an available switch providing lanes for communication between the peripheral devices and the available host, the available switch being the switch that is operational, the available switch comprising a reference clock, each peripheral device being bridged to the available switch through a PCI-Express bridge, the system comprising:
   a. a local clock oscillator on each peripheral device;

b. selecting means, the selecting means for selecting the local clock oscillator for each peripheral device;
c. isolating means, the isolating means isolating each peripheral device from the PCI-Express bridge after the selection of the local clock oscillator; and
d. connection means, the connection means providing a bus connection between the isolated peripheral devices to enable communication between the isolated peripheral devices.

11. A method for enabling redundancy in communication between a plurality of peripheral devices and a host, the peripheral devices and the host being connected through Peripheral Component Interconnect Express (PCI-Express) architecture in a data processing system, the host detecting and initializing the peripheral devices, the host enabling communication between the peripheral devices, the method comprising the steps of:
a. enabling exchange of data packets between the peripheral devices and the host through an available switch, the available switch being either a switch or a redundant switch, the switch providing lanes for communication between the peripheral devices and the host, the redundant switch providing redundant lanes for communication between the peripheral devices and the host, the exchange of data packets being enabled through the redundant switch when the switch is not operational; and
b. enabling exchange of data packets between an available host and the available switch, the available host being either the host or a redundant host, the redundant host providing redundant means for detecting and initializing the peripheral devices, the redundant host providing means for enabling the communication between the peripheral devices, the exchange of data packets being enabled between the redundant host and the available switch when the host is not operational.

12. The method in accordance with claim 11 further comprising the step of monitoring the availability of the redundant switch and the connections of the redundant switch, while the switch is operational.

13. The method in accordance with claim 11 further comprising the step of sequencing hot-swapping of a peripheral device, the hot-swapping being the connection and disconnection of the peripheral device without interrupting the operation of the data processing system.

14. The method in accordance with claim 11 further comprising the step of selecting a reference clock, a redundant reference clock or a local clock oscillator for each peripheral device, the reference clock residing on the switch, the redundant reference clock residing on the redundant switch, the local clock oscillator residing on each peripheral device, the reference clock being selected when the switch is operational, the redundant reference clock being selected when the redundant switch is operational, and the local clock oscillator being selected when no host and/or switch is operational.

15. The method in accordance with claim 11 further comprising the step of facilitating redundancy in communication between the peripheral devices and the host, wherein the step of facilitating comprises resetting the peripheral device for a predefined time.

16. The method in accordance with claim 11 wherein the method is carried out by a computer program product.

17. A method for enabling communication between a plurality of peripheral devices in the absence of an available host, each peripheral device and the available host being connected through Peripheral Component Interconnect Express (PCI-Express) architecture in a data processing system, the available host being the host that is operational, the available host detecting and initializing the peripheral devices, the available host enabling communication between the peripheral devices, an available switch providing lanes for communication between the peripheral devices and the available host, the available switch being the switch that is operational, the available switch comprising a reference clock, each peripheral device comprising a processor and a local clock oscillator, each peripheral device being bridged to the available switch through a PCI-Express bridge, the method comprising the steps of:
a. selecting the local clock oscillator for each peripheral device;
b. isolating each peripheral device from the PCI-Express bridge after selecting the local clock oscillator; and
c. providing a bus connection between the isolated peripheral devices to enable communication between the isolated peripheral devices.

18. The method in accordance with claim 17 wherein the method is carried out by a computer program product.

* * * * *